United States Patent [19]
Benesty et al.

[11] Patent Number: 5,828,756
[45] Date of Patent: Oct. 27, 1998

[54] STEREOPHONIC ACOUSTIC ECHO CANCELLATION USING NON-LINEAR TRANSFORMATIONS

[75] Inventors: Jacob Benesty, New Providence; Joseph Lindley Hall, II, Basking Ridge; Dennis Raymond Morgan, Morristown; Man Mohan Sondhi, Mountain Lakes, all of N.J.

[73] Assignee: Lucent Technologies Inc., Murray Hill, N.J.

[21] Appl. No.: 747,730

[22] Filed: Nov. 12, 1996

Related U.S. Application Data

[63] Continuation-in-part of Ser. No. 344,320, Nov. 22, 1994.

[51] Int. Cl.$^6$ .................................................... H04B 3/20
[52] U.S. Cl. ............................ 381/66; 379/410; 379/406
[58] Field of Search .......................... 381/66, 94.1, 71.1; 379/410, 411, 406

[56] References Cited

U.S. PATENT DOCUMENTS

| | | | |
|---|---|---|---|
| 5,274,705 | 12/1993 | Younce | 379/410 |
| 5,327,495 | 7/1994 | Shenoi | 379/410 |
| 5,390,250 | 2/1995 | Janse et al. | 379/410 |
| 5,636,323 | 6/1997 | Umemoto | 381/16 |

OTHER PUBLICATIONS

M. M. Sondhi et al., "Stereophonic Acoustic Echo Cancellation—An Overview of the Fundamental Problem," *IEEE Signal Processing Letters*, vol. 2, No. 8, 148–151 (Aug. 1995).
F.L. Wightman et al., "The diminant role of low–frequency interaural time differences in sounc localization$^{a)}$," *J. Acoust. Soc. Am.* vol. 91 (3), 1648–1661 (Mar. 1992).
J. Benesty et al., "A Multichannel Affine Projection Algorithm with Applications to Multichannel Acoustic Echo Cancellation," *IEEE Signal Processing Letters*, vol. 3, No. 2, 35–37 (Feb. 1996).
F. Amand et al., "A Fast Two–Channel Projection Algorithm for Stereophonic Acoustic Echo Cancellation," *Proc. IEEE ICASSP,* 949–952 (1996).
J. Benesty et al., "Adaptive Filtering Algorithms For Stereophonic Acoustic Echo Cancellation," *Proc. IEEE ICASSP,* 3099–3102 (1995).
S. Shimauchi et al., "Stereo Projection Echo Canceller With True Echo Path Estimation," *IEEE,* 3059–3062 (1995).
M. M. Sondhi et al., "Silencing Echoes on the Telephone Network," *Proceedings of the IEEE,* vol. 68, No. 8, 948–963 (Aug. 1980).
A. Hirano et al., "A Compact Multi–Channel Echo Canceller With A Single Adaptive Filter Per Channel," *Proc. 1992 Int'l. Sympos. Circuits Systems,* 1922–1925 (1992).
Y. Mahieux et al., "Echo Cancellation In Stereophonic Teleconferencing," *Proc. Quatorzieme Colloque GRETSI,* 515–518 (in French with translation) (1993).

*Primary Examiner*—Minsun Oh Harvey
*Attorney, Agent, or Firm*—Kenneth M. Brown

[57] ABSTRACT

A method and apparatus for estimating individual impulse responses for a stereophonic communication system, such as a teleconferencing system, which involves selectively reducing the correlation between the individual channel signals of the stereophonic system. Selective reduction of stereophonic source signal correlation advantageously results in the estimation of individual impulse responses of a receiving room of the stereophonic communication system. The selectively reduced-correlation source signals are provided to conventional adaptive filters and the receiving room loudspeakers. Automatic echo cancellation is performed in a conventional fashion, but on the selectively reduced-correlation source signals. Specifically, selective reduction of source signal correlation between two stereophonic channels of a teleconferencing system is achieved by introducing a small non-linearity into each channel in order to reduce the interchannel coherence. In accordance with certain illustrative embodiments of the present invention, each channel signal has added thereto a non-linear function of the channel signal itself, thereby reducing the interchannel coherence while preserving the quality of the signal. In one particular embodiment, the non-linear function comprises the half-wave rectifier.

40 Claims, 4 Drawing Sheets

STEREOPHONIC ACOUSTIC ECHO CANCELLATION USING NON-LINEAR TRANSFORMATIONS

CROSS-REFERENCE TO RELATED APPLICATION

The present application is a continuation-in-part of co-pending U.S. Patent Application entitled "Selective Signal Decorrelation For Stereophonic Acoustic Echo Cancellation" by Joseph Lindley Hall, Dennis R. Morgan, and Man Mohan Sondhi, Ser. No. 08/344,320, filed on Nov. 22, 1994. U.S. patent application Ser. No. 08/344,320 is hereby incorporated by reference as if fully set forth herein.

FIELD OF THE INVENTION

The present invention relates to acoustic echo cancellation and more specifically to stereophonic acoustic echo cancellation.

BACKGROUND OF THE INVENTION

The evolution of teleconferencing to a more lifelike and transparent audio/video medium depends upon, among other things, the evolution of teleconferencing audio capabilities. The more realistic the sound, the more lifelike a teleconference will be. Some present-day teleconferencing systems have already evolved to the point of including high-fidelity audio systems (100–7000 Hz bandwidth). These systems provide a significant improvement over older telephone systems (200–3200 Hz bandwidth). However, such high fidelity systems are by no means the limits of the audio evolution in teleconferencing.

Spatial realism is highly desirable for audio/video teleconferencing. This is because of the need of a listener to follow, for example, a discussion among a panel of dynamic, multiple, and possibly simultaneous talkers. The need for spatial realism leads to consideration of multi-channel (i.e., stereophonic) audio systems in teleconferencing, which, at a minimum, involves two channels.

Many present-day teleconferencing systems have a single (monophonic) full-duplex audio channel for voice communication. These systems, which range from simple speakerphones to modern video teleconferencing equipment, typically employ acoustic echo cancelers (AECs) to remove undesired echos that result from acoustic coupling. This coupling results when sound, emitted from the teleconference loudspeaker (in response to a signal from a remote location), arrives at a teleconference microphone. The microphone generates a signal in response to this sound (i.e., this echo). This microphone signal is then transmitted to the remote location. An AEC employs an adaptive filter to estimate the impulse response from the loudspeaker to the microphone in a room in which an echo occurs and to generate a signal which is used to cancel that echo electrically. Like monophonic teleconferencing, high-quality stereophonic teleconferencing requires AEC. (See, e.g., M. M. Sondhi and D. R. Morgan, "Acoustic echo cancellation for stereophonic teleconferencing," *Proc. IEEE ASSP Workshop Appls. Signal Processing Audio Acoustics*, 1991, which is hereby incorporated by reference as if fully set forth herein.)

Stereophonic AEC presents a problem which does not exist in the monophonic context, however. In monophonic teleconferencing systems, a single adaptive filter is used to estimate a single impulse response from the loudspeaker to the microphone in the room experiencing an echo. There is but one impulse response to estimate because there is but one loudspeaker and one microphone in the room. As the adaptive filter impulse response estimate approaches the true impulse response of the room, the difference between these responses approaches zero. Once their difference is very small, the effects of echos are reduced. The ability to reduce echo is independent of the signal from the loudspeaker, since the real and estimated impulse responses are equal (or nearly so) and both the room (with its real impulse response) and the adaptive filter (with its estimated impulse response) are excited by the same signal.

In multi-channel stereophonic teleconferencing systems, multiple (e.g., two) adaptive filters are used to estimate the multiple (e.g., two) impulse responses of the room. Each adaptive filter is associated with a distinct acoustic path from a loudspeaker to a microphone in the receiving room. Rather than being able to independently estimate the individual impulse responses of the room, conventional stereophonic AEC systems derive impulse responses which have a combined effect of reducing echo. This imitation on independent response derivation is due to the fact that the AEC system can measure only a single signal per microphone. This signal is the sum of multiple acoustic signals arriving at a single microphone through multiple acoustic paths. Thus, the AEC cannot observe the individual impulse responses of the room. The problem with deriving impulse response estimates based on the combined effect of reduced echo is that such combined effect does not necessarily mean that the actual individual impulse responses are accurately estimated. Unless individual impulses responses are accurately estimated, the ability of the AEC system to be robust to changes in the acoustic characteristics of the remote location is limited and undesirable lapses in performance may occur. (See, e.g., M. M. Sondhi, D. R. Morgan, and J. L. Hall, "Stereophonic acoustic echo cancellation—An overview of the fundamental problem," *IEEE Signal Processing Lett.*, Vol. 2, No. 8, Aug. 1995, pp. 148–151, which is hereby incorporated by reference as if fully set forth herein.)

SUMMARY OF THE INVENTION

The present invention provides a technique for estimating individual impulse responses for a stereophonic communication system, such as a teleconferencing system. The technique involves selectively reducing the correlation between the individual channel signals (source signals) of the stereophonic system. Selective reduction of stereophonic source signal correlation advantageously results in the estimation of individual impulse responses of a receiving room of the stereophonic communication system. The selectively reduced-correlation source signals are provided to conventional adaptive filters and the receiving room loudspeakers. AEC function is performed in the conventional fashion, but on the selectively reduced-correlation source signals.

Specifically, selective reduction of source signal correlation between two stereophonic channels of a teleconferencing system is achieved by introducing a (preferably small) non-linearity into each channel in order to reduce the interchannel coherence. In accordance with certain illustrative embodiments of the present invention, each channel signal has added thereto a (small) non-linear function of the channel signal itself, thereby reducing the interchannel coherence while preserving the perceptual quality of the signal. In one particular embodiment, for example, the non-linear function comprises the half-wave rectifier.

DETAILED DESCRIPTION

Introduction

For clarity of explanation, the illustrative embodiments of the present invention described herein are presented as comprising individual functional blocks. The functions that these blocks represent may be provided through the use of either shared or dedicated hardware, including, but not limited to, hardware capable of executing software. For example, the functions of the blocks presented in the various illustrative figures may be provided by a single shared processor. (Use of the term "processor" should not be construed to refer exclusively to hardware capable of executing software.) Illustrative embodiments may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

As used herein, the term "stereophonic" refers to a multiple-channel audio system. Each of the illustrative embodiments discussed below has two channels. However, it will be obvious to those skilled in the art that each of these embodiments may be easily modified in accordance with the principles of the present invention so as to handle any plural number of channels.

Figure 1:
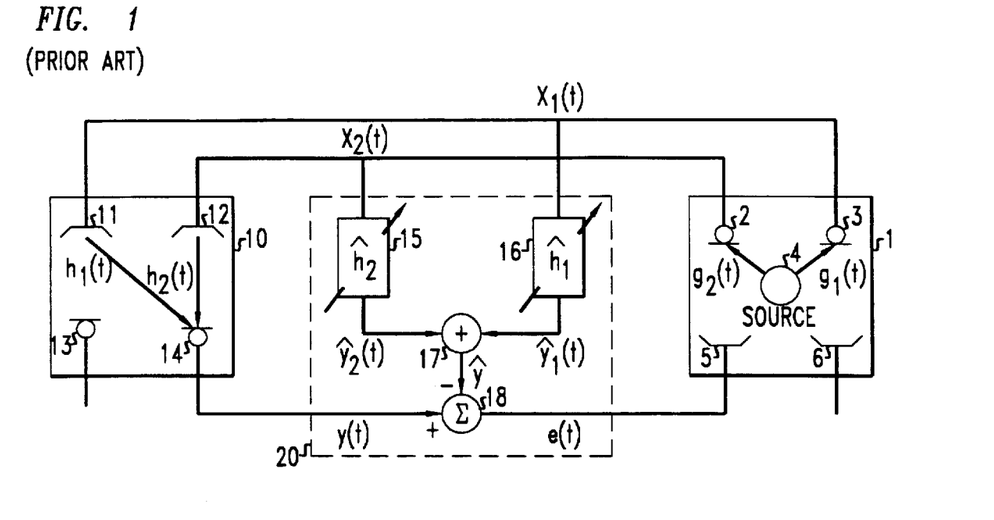
FIG. 1 presents a schematic diagram of a conventional stereophonic teleconferencing system.

FIG. 1 presents a schematic diagram of a conventional stereophonic (two-channel) AEC system in the context of stereo teleconferencing between two locations. A transmission room 1 is depicted on the right of the figure. Transmission room 1 includes two microphones 2, 3 which are used to pick up signals from an acoustic source 4 (e.g., a speaking person) via two acoustic paths that are characterized by the impulse responses $g_1(t)$ and $g_2(t)$. (For clarity of presentation, all acoustic paths are assumed to include the corresponding loudspeaker and/or microphone responses.) Output from microphones 2, 3 are stereophonic channel source signals $x_2(t)$ and $x_1(t)$, respectively. These stereophonic channel source signals, $x_2(t)$ and $x_1(t)$, are then transmitted via a telecommunications network (such as a telephone or an ATM network) to loudspeakers 11, 12 in a receiving room 10 (shown on the left), typically at a location which is remote from that of transmission room 1. Loudspeakers 11, 12 are acoustically coupled to microphone 14 in receiving room 10 via the paths indicated with impulse responses $h_1(t)$ and $h_2(t)$. These are the paths by which acoustic echo signals arrive at microphone 14.

The output of the microphone 14 is signal $y(t)$, which is a signal representing acoustic signals in the receiving room impinging on the microphone. These acoustic signals include the acoustic echo signals. Loudspeakers 11, 12 are also acoustically coupled to microphone 13 by other acoustic paths. For clarity of presentation, however, only the coupling to microphone 14 and AEC with respect to its output will be discussed. Those of ordinary skill in the art will recognize that the analysis concerning AEC for the output of microphone 14 is applicable to the output of microphone 13 as well. Similarly, those skilled in the art will recognize that AEC as performed for the outputs of microphones 13 and 14 in receiving room 10 may also be advantageously performed for the outputs of microphones 2 and 3 in transmitting room 1, wherein the functions of receiving room 10 and transmitting room 1 are swapped.

If nothing were done to cancel the acoustic echo signals in receiving room 10, these echoes would pass back to loudspeaker 5 in transmission room 1 (via microphone 14 and back through the telecommunications network) and would be circulated again and again, producing undesirable multiple echoes, or even worse, causing howling instability. This, of course, is the reason that providing AEC capability is advantageous.

Conventional AECs typically derive an estimate of the echo with use of a finite impulse response (FIR) filter with adjustable coefficients. This "adaptable" filter models the acoustic impulse response of the echo path in the receiving room 10. FIG. 1 generalizes this technique with use of AEC 20 using two adaptive FIR filters 16, 15 having impulse responses, $\hat{h}_1(t)$ and $\hat{h}_2(t)$, respectively, to model the two echo paths in the receiving room 10. Filters 16, 15 may be located anywhere in the system (i.e., at the transmitting room 1, in the telecommunications network, or at the receiving room 10) but are preferably located at the receiving room 10.

Driving these filters 16, 15 with the loudspeaker signals $x_1(t)$ and $x_2(t)$ produces signals $\hat{y}_1(t)$ and $\hat{y}_2(t)$, which are components of a total echo estimate. The sum of these two echo estimate component signals—i.e., $\hat{y}_1(t)$ and, $\hat{y}_2(t)$—yields the total echo estimate signal, $\hat{y}(t)$, at the output of summing circuit 17. This echo estimate signal, $\hat{y}(t)$, is subtracted from the echo signal $y(t)$ with use of subtraction circuit 18 to form an error signal $e(t)$. Error signal $e(t)$ is intended to be small (i.e., driven towards zero) in the absence of near-end speech (i.e., speech generated in the receiving room).

In most conventional AEC applications, the coefficients of adaptive filters 15, 16 are derived using well-known techniques, such as the LMS (or stochastic gradient) algorithm, familiar to those of ordinary skill in the art. The coefficients are updated in an effort to reduce the error signal to zero. As such, the coefficients $\hat{h}_1(t)$ and $\hat{h}_2(t)$ are a function of the stereophonic signals, $x_2(t)$ and $x_1(t)$, and the error signal, $e(t)$.

The Stereophonic Echo Cancellation Problem

Unlike monophonic AECs, conventional stereophonic AECs do not independently estimate the individual impulse responses of a room. Rather, conventional stereophonic AEC systems derive impulse responses which have a combined effect of reducing echo. The problem with deriving impulse response estimates based on the combined effect of reduced echo is that such combined effect does not necessarily mean that the actual individual impulse responses are accurately estimated. Unless individual impulse responses are accurately estimated, the ability of the AEC system to be robust to changes in the acoustic characteristics of the remote location is limited and undesirable lapses in performance may occur.

To see this problem in terms of the operation of the stereophonic teleconferencing system of FIG. 1, consider the following. The signal output from microphone 14 may be described as $$y(t) = h_1(t) * x_1(t) + h_2(t) * x_2(t), \quad (1)$$

where $h_1$ and $h_2$ are the loudspeaker-to-microphone impulse responses in receiving room 10, $x_1$ and $x_2$ are stereophonic source signals provided to loudspeakers 11, 12, and "*" denotes convolution. (Sampled signals are assumed throughout so that the time index t is an integer.) The error signal, e(t), may be written as $$e(t) = y(t) - \hat{h}_1^T x_1 - \hat{h}_2^T x_2, \quad (2a)$$

where $\hat{h}_1$ and $\hat{h}_2$ are N-dimensional vectors of the adaptive filter coefficients and where $x_1 = [x_1(t), x_1(t-1), \ldots x_1(t-N-1)]^T$ and $x_2 = [x_2(t), x_2(t-1), \ldots x_2(t-N-1)]^T$ are vectors comprising the N most recent source signal samples, with superscript T denoting a transpose operation. The error signal can be written more compactly as $$e(t) = y(t) - \hat{h}^T x, \quad (2b)$$

where $\hat{h} = [\hat{h}_1^T | \hat{h}_2^T]^T$ is the concatenation of $\hat{h}_1$ and $\hat{h}_2$, and likewise, $x = [x_1^T | x_2^T]^T$.

Assuming that N is large enough, the signal y(t) can be written as $$y(t) = h_1^T x_1 + h_2^T x_2 = h^T x \quad (3)$$

where $h_1$ and $h_2$ are the true impulse response vectors in the receiving room and where $h = [h_1^T | h_2^T]^T$. In terms of h, we may rewrite (2b) as $$e(t) = (h - \hat{h})^T x = \tilde{h}^T x \quad (4)$$

where $$\tilde{h} = \hat{h} - h \quad (5)$$

is the impulse response misalignment vector.

Assume that e(t) has been driven to be identically zero. From (4), it follows that $$\tilde{h}_1 * x_1 + \tilde{h}_2 * x_2 = 0 \quad (6)$$

For the single-talker situation depicted in FIG. 1, for example, this further implies $$[\tilde{h}_1 * g_1 + \tilde{h}_2 * g_2] * s(t) = 0, \quad (7)$$

where s(t) is the acoustic signal generated by the talker in the transmission room. In the frequency domain, (7) becomes $$[\tilde{H}_1(j\omega) G_1(j\omega) + \tilde{H}_2(j\omega) G_2(j\omega)] S(j\omega) = 0, \quad (8)$$

where the Fourier transforms of time functions are denoted by corresponding uppercase letters.

Consider first a single-channel situation, say $G_2 = 0$. In that case, except at zeroes of $G_1 S$, (8) yields $\tilde{H}_1 = 0$. Thus, complete alignment (i.e., $\hat{h}_1 = h$) is achieved by ensuring that $G_1 S$ does not vanish at any frequency. Of course, if the receiving room impulse response, $h_1$, changes, then the adaptation algorithm of adaptive filters 15, 16 must track these variations.

In the stereophonic situation, on the other hand, even if S has no zeroes in the frequency range of interest, the best that can be achieved is $$\tilde{H}_1 G_1 + \tilde{H}_2 G_2 = 0. \quad (9)$$

This equation does not imply that $\tilde{H}_1 = \tilde{H}_2 = 0$, which is the condition of complete alignment. The problem with stereo echo cancelers is apparent from (9): even if the receiving room impulse responses, $h_1$ and $h_2$, are fixed, any change in $G_1$ or $G_2$ requires adjustment of $\hat{H}_1$ and $\hat{H}_2$ (except in the special case where $\tilde{H}_1 = \tilde{H}_2 = 0$). Thus, not only must the adaptation algorithm of filters 15, 16 track variations in the receiving room, it must also track variations in the transmission room. The latter variations are particularly difficult to track; for if one talker stops talking and another starts talking at a different location in the room, the impulse responses, $g_1$ and $g_2$, change abruptly and by very large amounts.

As can be seen from the above discussion, therefore, the challenge is to devise an approach which (as in the case of a single-channel echo canceler) converges independently of variations in the transmission room. Also, note that if $x_1$ and $x_2$ in (6) are uncorrelated, then (6) implies that $\tilde{h}_1 = \tilde{h}_2 = 0$. For this reason, the present invention is aimed at decorrelating $x_1$ and $x_2$.

A First Illustrative Embodiment

Figure 2:
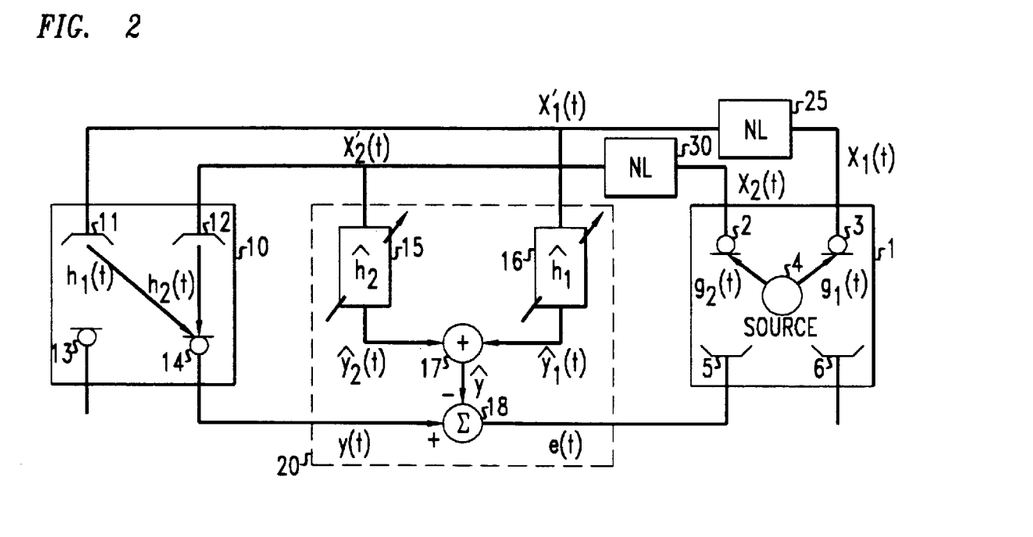
FIG. 2 presents a schematic diagram of a stereophonic teleconferencing system in accordance with a first illustrative embodiment of the present invention.

FIG. 2 presents a schematic diagram of a stereophonic teleconferencing system in accordance with a first illustrative embodiment of the present invention. The system of FIG. 2 is identical to that of FIG. 1 except for the presence of non-linear signal transformation modules 25, 30 (NL) which have been inserted in the paths between microphones 3, 2 of transmission room 1 and loudspeakers 11, 12 of receiving room 10. By operation of non-linear transformation modules 25, 30, stereophonic source signals $x_1(t)$ and $x_2(t)$ are transformed to signals $x_1'(t)$ and $x_2'(t)$, respectively, where "'" indicates a transformed signal which (in this case) advantageously has a reduced correlation with the other transformed signal of the stereophonic system.

As with the system presented in FIG. 1, the filters of AEC 20 may be located anywhere within the system, but are preferably located at receiving room 10. Non-linear transformation modules 25, 30 may also be located anywhere (so long as receiving room 10 and AEC 20 both receive the transformed signals as shown), but are preferably located at transmitting room 1.

Specifically, in accordance with the first illustrative embodiment of the present invention, the signals $x_1(t)$ and $x_2(t)$ are advantageously partially decorrelated by adding to each a small non-linear function of the corresponding signal itself. It is well-known to those skilled in the art that the coherence magnitude between two processes is equal to one (1) if and only if they are linearly dependent. Therefore, by adding a "noise" component to each signal, the coherence is reduced. However, by combining the signal with an additive component which is similar to the original signal, the audible degradation may be advantageously minimized, as compared to the effect of adding, for example, a random noise component. This is particularly true for signals such as speech, where the harmonic structure of the signal tends to mask the distortion.

Figure 3:
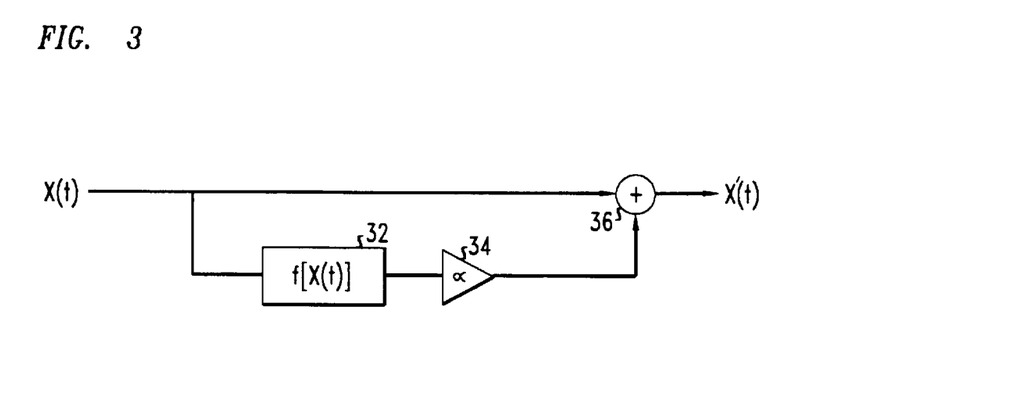
FIG. 3 presents a schematic diagram of an illustrative non-linear signal transformation for use in accordance with the illustrative embodiment of the present invention shown in FIG. 2.

FIG. 3 presents a schematic diagram of an illustrative non-linear transformation module which may be used to implement non-linear transformation modules 25, 30 of the system of FIG. 2. In the schematic shown in FIG. 3, non-linear function module 32 is applied to the original signal, x(t), and the result is multiplied by a (small) factor, $\alpha$, with use of multiplier 34. The result is combined with the original signal, x(t), to produced the transformed signal, x'(t), as shown. In other words, for i = 1, 2, $$x_i'(t)=x_i(t)+\alpha f_i[x_i(t)], \quad (10)$$

where functions $f_1$ and $f_2$ are advantageously non-linear. Thus, a linear relation between $x_1'(t)$ and $x_2'(t)$ is avoided, thereby ensuring that the coherence magnitude will be smaller than one. (As will be obvious to those skilled in the art, such a transformation reduces the coherence and hence the condition number of the covariance matrix, thereby improving the misalignment.) Of course, the use of this transformation is particularly advantageous when its influence is inaudible and does not have any deleterious effect on stereo perception. For this reason, it is preferable that the multiplier $\alpha$ be relatively small.

In one illustrative embodiment of the present invention, the non-linear functions $f_1$ and $f_2$ (as applied by non-linear function module 32) are each half-wave rectifier functions, familiar to those skilled in the art and defined as:

$$f(x) = \frac{x + |x|}{2} = \begin{cases} x & \text{if } x > 0 \\ 0 & \text{otherwise} \end{cases} \quad (11)$$

In this case, the multiplier $\alpha$ of equation (10) may advantageously be set to a value less than 0.5, and, preferably, to a value in the range 0.1 to 0.3. In other illustrative embodiments, each of $f_1$ and $f_2$ may be any other non-linear function such as, for example, a full-wave rectifier function (defined as $f(x)=|x|$), a hard limiter function (defined as $f(x)=\text{sgn}(x)$), a square-law function (defined as $f(x)=x^2$), a square-sign function (defined as $f(x)=x^2\text{sgn}(x)$), a cubic function (defined as $f(x)=x^3$), or any of a number of other non-linear functions which will be both obvious and familiar to one of ordinary skill in the art.

Hybrid stereo/mono AECs in accordance with additional illustrative embodiments

Figure 4:
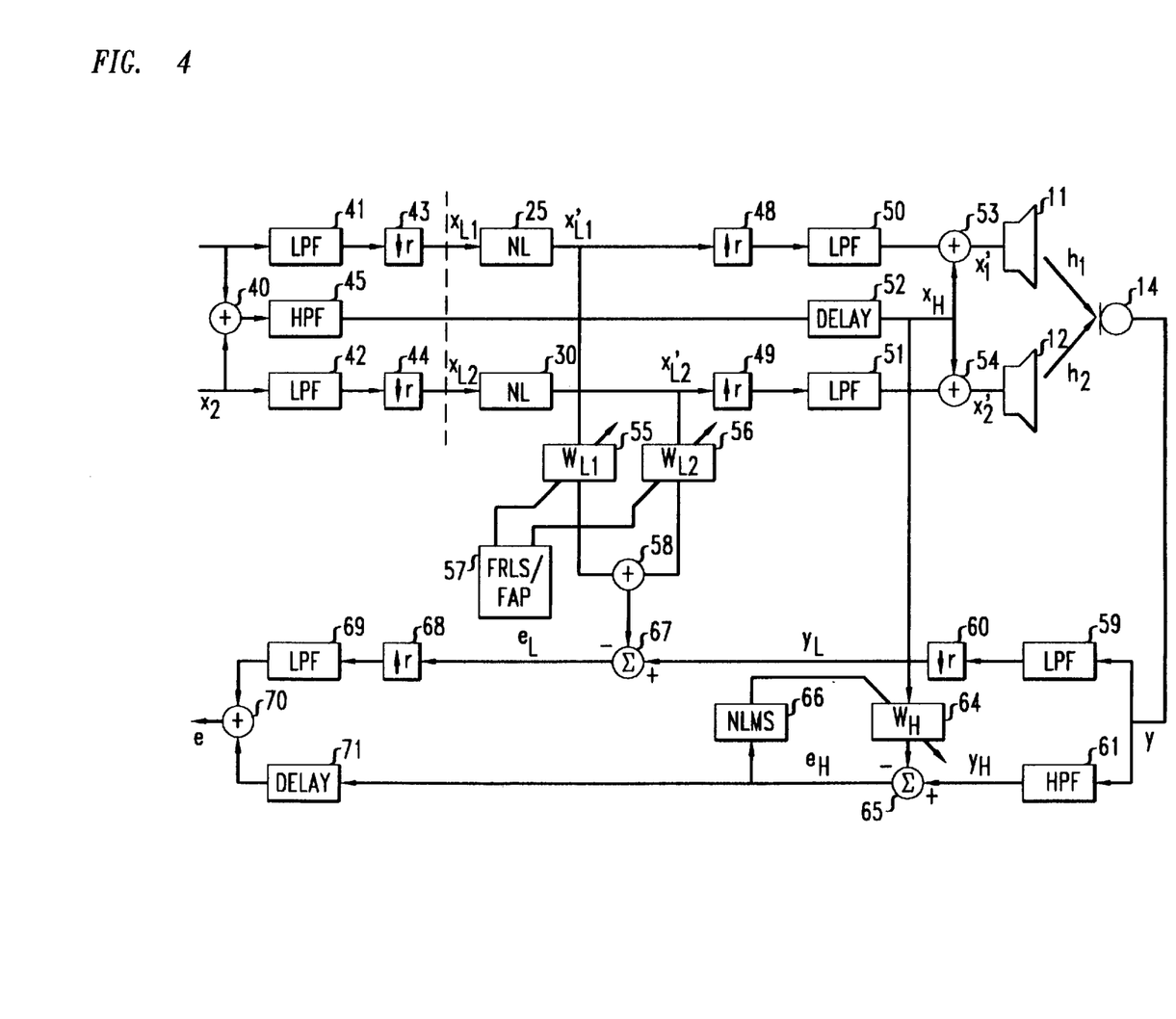
FIG. 4 presents a schematic diagram of a hybrid stereo/mono AEC system in accordance with one alternative illustrative embodiment of the present invention.

FIG. 4 presents a schematic diagram of an AEC in accordance with one alternative illustrative embodiment of the present invention. The illustrative AEC of FIG. 4 is based on the observation that the stereo effect is primarily due to sound energy below some critical frequency, which is illustratively in the neighborhood of 1000 Hz. As such, the illustrative system of FIG. 4 advantageously comprises a hybrid mono/stereo AEC which uses stereophonic sound with a stereo AEC component in accordance with the present invention at low frequencies (e.g., below the critical frequency), while using monophonic sound with a conventional mono AEC component at higher frequencies (e.g., above the critical frequency). This hybrid approach provides an advantageous compromise between the complexity of a full-band stereo AEC (as provided, for example, by the illustrative embodiment shown in FIG. 2) and the goal of achieving full spatial realism.

Specifically, in accordance with the present invention as implemented, for example, by the illustrative embodiment shown in FIG. 2, it is advantageous to use fast adaptive algorithms (in terms of convergence rate) so as to achieve good quality echo cancellation. This implies a relatively high level of complexity, e.g., in terms of memory and number of operations required, potentially making a real-time implementation somewhat costly. Moreover, in the context of the illustrative full-band stereo AEC system of FIG. 2, even the two-channel fast recursive least-squares (FRLS) algorithm, familiar to those skilled in the art, converges somewhat slower than that which would be ideal. For this reason, it may be advantageous to provide an AEC system that converges faster and is easier (and less costly) to implement than, for example, the full-band scheme of the illustrative system of FIG. 2, while still retaining good spatial realism. This objective is advantageously achieved by a hybrid stereo/mono AEC system in accordance with certain alternative illustrative embodiments of the present invention, such as, for example, the illustrative system shown in FIG. 4.

Although the understanding of the stereo effect from a psychoacoustical point of view is complex, experiments show that the stereophonic cues are essentially located below the critical frequency (e.g., 1000 Hz), while little, if anything, is contributed to localization above that frequency. (See, e.g., F. L. Wightman and D. J. Kistler, "The dominant role of low-frequency interaural time differences in sound localization," *J. Acoust. Soc. Am.*, vol. 91, pp. 1648–1661, Mar. 1992, which is hereby incorporated by reference as if fully set forth herein.) The illustrative hybrid stereo/mono AEC system of FIG. 4 is based on this psychoacoustical principle in combination with the principles of the present invention. (Note that in the illustrative diagrams shown in FIGS. 4, 5 and 6, the vertical dashed line indicates an illustrative division between the components which may illustratively be located at the transmitting room—i.e., those to the left of the line—and those which may illustratively be located at the receiving room—i.e., those to the right of the line. Also note, however, that such a location of components is merely illustrative. It will be obvious to those skilled in the art that, in other alternative embodiments, the various components may be distributed in other ways.)

Specifically, the two signals $x_1$ and $x_2$ (i.e., the left and right channel signals) are first filtered by low-pass filters 41, 42, respectively, and then downsampled by downsamplers 43, 44, respectively, to produce two low-frequency stereo signals $x_{L1}$ and $x_{L2}$. In this manner, the frequencies below the critical frequency (e.g., 1000 Hz) are maintained in two independent channels for purposes of realizing the stereo effect. Meanwhile, the sum of the left and right channels, $x_1+x_2$ (as computed by summing circuit 40), is filtered by high-pass filter 45 to keep the frequencies above the critical frequency as a monophonic signal, namely, $x_H$ (after having been delayed by delay 52). In addition, non-linear transformation modules 25, 30 are provided for each low-frequency channel in accordance with the principles of the present invention, in a manner similar to that of the illustrative system of FIG. 2.

Left and right loudspeakers 11, 12 provide the stereo signals in the receiving room as the sum of the combined (i.e., mono) high-frequency components signal (from delay 52) and the low-frequency component signals of the left and right channels, respectively (from summing circuits 53, 54, after the two low-frequency component signals have been upsampled and filtered by upsamplers 48, 49 and low-pass filters 50, 51). Note that two essentially independent AEC modules are provided: one mono AEC module (comprising adaptive filter 64, adaptation algorithm 66 and subtraction circuit 65) for processing the high-frequency component signal, and one stereo AEC module (comprising adaptive filters 55, 56, adaptation algorithm 57, summing circuit 58 and subtraction circuit 67) for processing the two low-frequency component signals. These independent AEC modules are used to generate individual low-frequency and high-frequency error signals ($e_L$ and $e_H$, respectively), each generated in an otherwise conventional manner, after the signal y (from microphone 14 in the receiving room) has itself been separated into low-frequency and high-frequency component signals (i.e., $y_L$ and $y_H$, respectively) by low-pass filter 59 (and downsampler 60) and high-pass filter 61, respectively. Finally, these two individual error signals ($e_L$ and $e_H$) are combined by summing circuit 70 to produce the final error signal, e (after the low-frequency error signal, $e_L$, has been upsampled by upsampler 68 and filtered by low-pass filter 69, and after the high-frequency error signal, $e_H$, has been delayed by delay 71).

Although somewhat more complex in appearance, a hybrid stereo/mono AEC system such as the illustrative system of FIG. 4 is actually easier to implement than a full-band AEC system such as the illustrative system shown in FIG. 2, for example, despite the fact that there are two different AEC modules in the illustrative hybrid system of FIG. 4. To see this, note first that for the stereo AEC module, with the maximum frequency, $f_m$, illustratively chosen to be 1000 Hz, the low-pass filtered signals may be advantageously subsampled by a factor $r=f_s/2f_m=f_s/2000$, where $f_s$ is the sampling rate of the system (in Hz). (Note, in particular, subsamplers 43, 44 of the illustrative system of FIG. 4.) As a result, the arithmetic complexity is reduced by a factor of $r^2$ in comparison with a full-band AEC implementation such as that of the illustrative system of FIG. 2. (In particular, note that the number of taps and the number of computations per second may both be reduced by a factor of r.) Therefore, a rapidly converging adaptive algorithm, such as, for example, the two-channel FRLS, familiar to those skilled in the art, may be advantageously used as shown, for example, by adaptation algorithm 57 of the system of FIG. 4. (See, e.g., J. Benesty, F. Amand, A. Gilloire, and Y. Grenier, "Adaptive Filtering Algorithms for Stereophonic Acoustic Echo Cancellation," in *Proc. IEEE ICASSP*, 1995, pp. 3099–3102, which is hereby incorporated by reference as if fully set forth herein.) On the other hand, the simple NLMS algorithm, also familiar to those skilled in the art, can be used to update the filter coefficients in the high frequency band. Convergence of the NLMS algorithm may be slower than that of the FRLS algorithm, but this is typically of little concern, since most of the energy in speech, for example, is at low frequencies.

Figure 5:
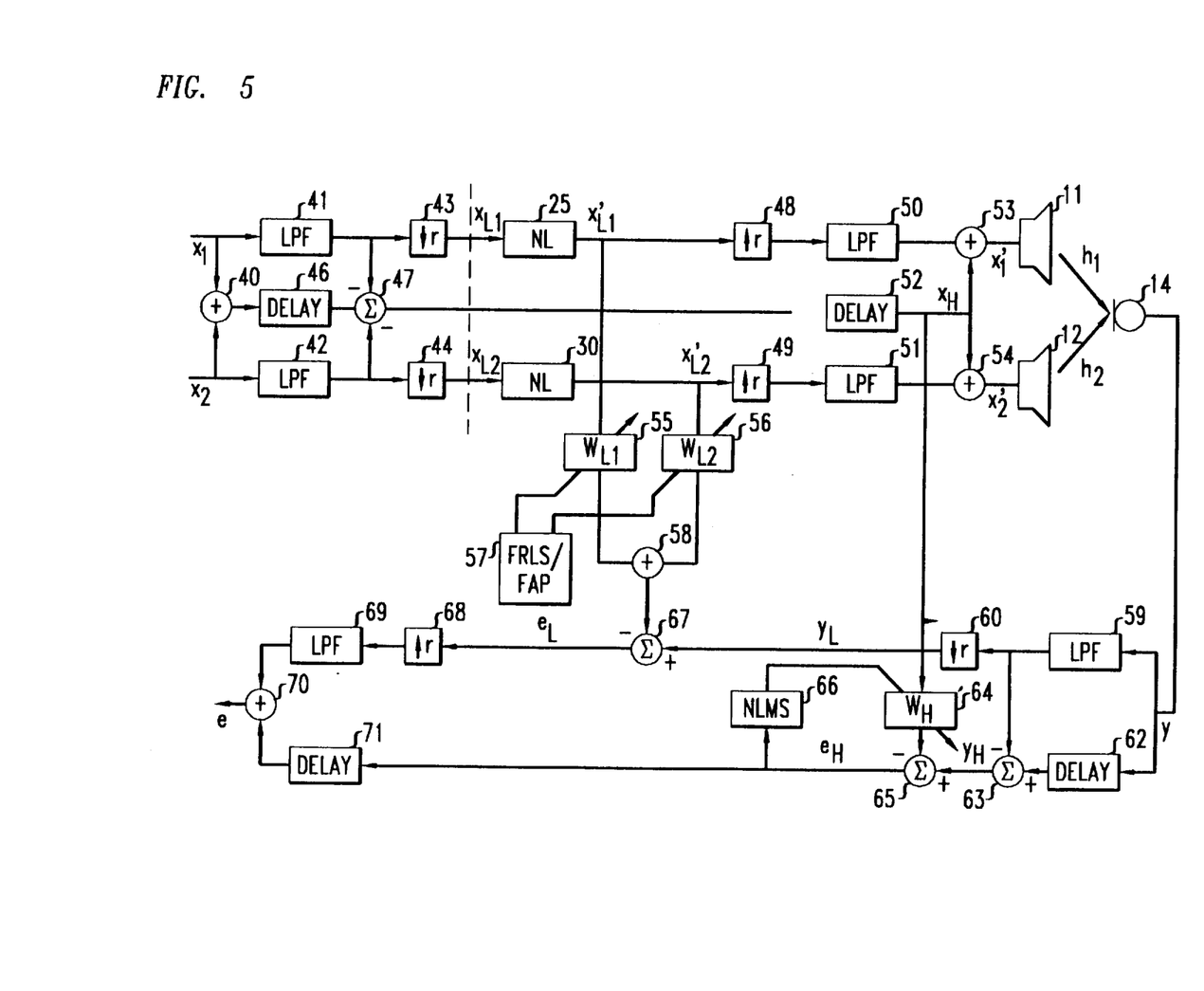
FIG. 5 presents a schematic diagram of a hybrid stereo/mono AEC system in accordance with another alternative illustrative embodiment of the present invention.

FIG. 5 presents a schematic diagram of a hybrid stereo/mono AEC system in accordance with another alternative illustrative embodiment of the present invention, which is similar to the illustrative system shown in FIG. 4. In the illustrative system of FIG. 5, however, the high-pass filters found in the illustrative system of FIG. 4 are replaced by simple subtractions. That is, in place of high-pass filter 45, the illustrative system of FIG. 5 uses subtraction circuit 47 to subtract each of the individual channel's low-pass filtered signals from the combined (original) signal (after having been delayed by delay 46), to generate the high-frequency component signal $x_H$ (from the sum of the original signals and the two low-frequency component signals $x_{L1}$ and $x_{L2}$). Similarly, high-pass filter 61 is replaced by subtraction circuit 63 which subtracts the low-pass filtered microphone signal ($y_L$) from the original microphone signal (y), to generate the high-frequency microphone signal $y_H$. Otherwise, the illustrative system of FIG. 5 operates in an identical manner to the illustrative system of FIG. 4.

Figure 6:
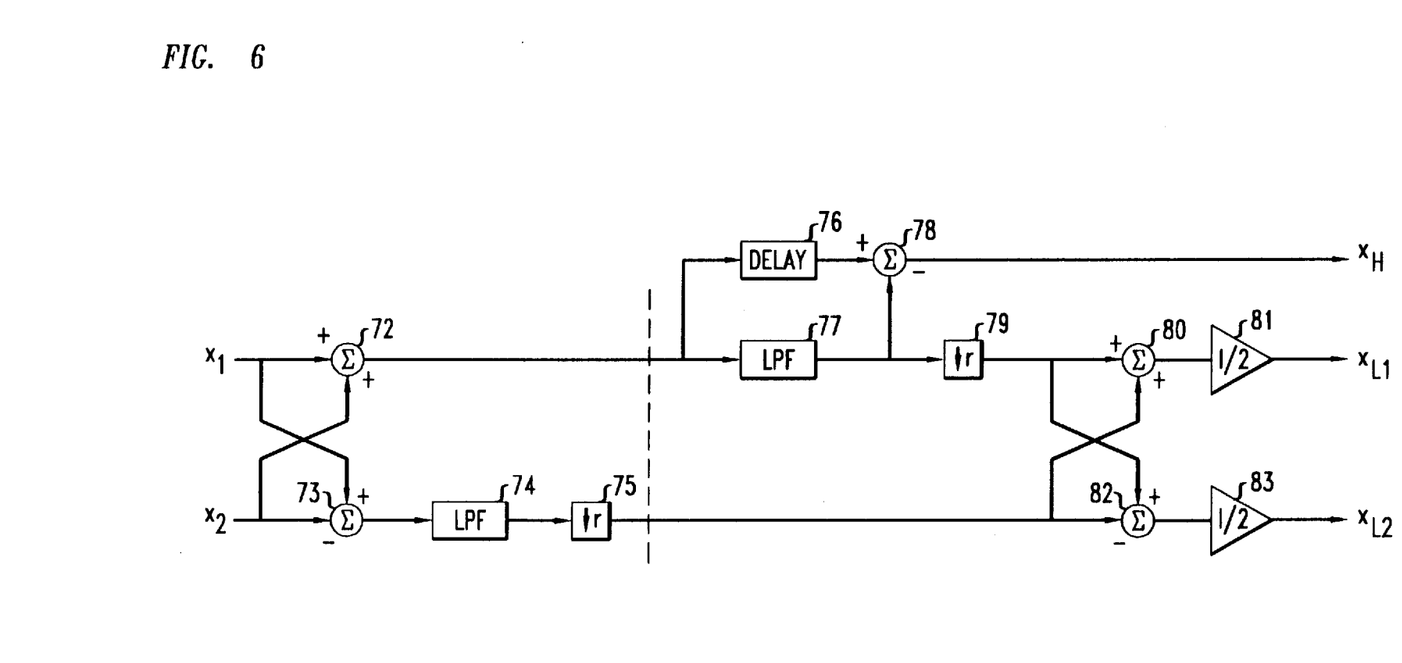
FIG. 6 presents a schematic diagram of a portion of a stereophonic teleconferencing system employing a hybrid stereo/mono AEC for use in combination with certain alternative illustrative embodiments of the present invention.

Finally, FIG. 6 presents a schematic diagram of a portion of a stereophonic teleconferencing system employing a hybrid stereo/mono AEC for use in combination with certain illustrative embodiments of the present invention, such as those shown, for example, in FIGS. 4 and 5. Instead of transmitting two independent (i.e., left and right) channels, the illustrative system partially shown by the schematic diagram of FIG. 6 transmits (for example, from a transmitting room such as transmission room 1 of FIG. 1) a low-frequency component "difference" signal formed by first subtracting one of the original channel signals from the other (i.e., $x_1-x_2$), and then low-pass filtering the result, along with a full-band monophonic signal formed by adding the two original channel signals together (i.e., $x_1+x_2$). Specifically, subtraction circuit 73, low-pass filter 74 and downsampler 75 as shown in the figure produce the low-frequency component "difference" signal, while summing circuit 72 produces the full-band monophonic signal.

Then, at the receiver (for example, at a receiving room such as receiving room 10 of FIG. 1), a high-frequency component monophonic signal, $x_H$, may be generated along with two individual channel low-frequency component signals, $x_{L1}$ and $x_{L2}$. Specifically, the received full-band monophonic signal is filtered by low-pass filter 77 and subtracted from the received full-band monophonic signal itself (after having been delayed by delay 76) by subtraction circuit 78, thereby generating the high-frequency component signal, $X_H$. And the two low-frequency component signals, $x_{L1}$ and $x_{L2}$, are generated by taking the sum (see summing circuit 80) and the difference (see subtraction circuit 82), respectively, of the low-pass filtered full-band monophonic signal (after downsampling by downsampler 79) and the received low-frequency component "difference" signal, and dividing each by two (see dividers 81, 83).

This approach is more in the spirit of conventional stereophonic encoding techniques, which often use sum and difference transmission for efficient coding and upward compatibility. Thus, with the use of any of the above-described illustrative hybrid stereo/mono AEC techniques in accordance with the present invention, the complexity of the AEC system is advantageously decreased and the convergence rate of the adaptive algorithms is increased, while most, if not all, of the stereo effect is preserved.

Alternative Embodiments Addressing Alternative Applications

Although the embodiments of the present invention discussed above are directed in particular to the task of stereophonic teleconferencing, the principles of the present invention may be applied to other applications as well. In many other applications such as, for example, desk-top conferencing and interactive video gaming, only one microphone may be provided in each location for transmitting (e.g., speech) signals, but multiple (e.g., two) loudspeakers are nonetheless provided in each location. In this case, stereo signals may be synthesized at the receiving room to create a stereophonic effect. For example, in the case of a desk-top conference involving multiple participants, a stereo effect may advantageously be produced at each receiving room in order to create an artificial spatial dimension comprising the multiple transmitting rooms (i.e., the other participants). Similarly, in the case of interactive video gaming, stereophonic game sound effects are typically created to more realistically depict the environment of the particular game being played.

Note that it is in general well known to apply AEC techniques to applications other than teleconferencing. Moreover, in many of these applications, such as, for example, the aforementioned interactive video gaming case, the signal which is being cancelled may, in fact, not comprise an "echo" in the conventional sense of the word at all. Rather, and as is well understood by those skilled in the art, when AEC techniques are applied to such applications, the "echo" signal which is advantageously cancelled may comprise any particular undesirable portion of the signal which is picked up by the particular microphone in the "receiving room." In the interactive video gaming application, for example, the undesired portion of the signal to be cancelled is that portion produced by the game sound effects in the receiving room. As such, the phrase "acoustic echo signal" as used herein and in the instant claims, is intended to encompass this broader meaning.

Note also that in the aforementioned applications of desk-top conferencing and interactive video gaming, the functions $g_1(t)$ and $g_2(t)$ of FIGS. 1 and 2 no longer represent acoustic responses of the transmitting room, but instead represent functions used to synthesize the two stereo signals. As is well known to those of ordinary skill in the art, it is common to synthesize a pair of stereo signals such that one of the signals is merely an attenuated and/or delayed version of the other—that is, the functions $g_1(t)$ and $g_2(t)$ differ only in amplitude and/or delay. When the principles of the present invention are applied in such a case, however, note that it is advantageous that the non-linear functions $f_1$ and $f_2$ be different non-linear functions. This is due to the fact that if $f_1 = f_2$, then the resulting signals $x_1'(t)$ and $x_2'(t)$ are not, in this case, decorrelated, as is desired. In one embodiment of the present invention which may be applied in such applications, $f_1$ is illustratively a positive half wave rectifier, defined as $f(x) = (x + |x|)/2$, and $f_2$ is illustratively a negative half wave rectifier, defined as $f(x) = (x - |x|)/2$.

Other Alternative Embodiments

Although several specific embodiments of the present invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention.

For example, although non-linear transformation modules 25, 30 of the illustrative embodiment of FIG. 2 are shown as being located in the transmission path outside of AEC 20, such transformations could alternatively be incorporated inside the AEC 20. In such an embodiment, signals $x_1'(t)$ and $x_2'(t)$ could be provided to receiving room 10 from AEC 20.

AEC and signal decorrelation in accordance with the present invention may be performed within a telecommunications network. A typical network application would involve an embodiment of the present invention at, for example, a network switch. However, those of ordinary skill in the art will understand that the present invention may also be implemented locally at the transmission site or at the receiving site, as part of the local teleconferencing equipment. As such, it may be incorporated into telephones, loudspeaker systems, microphone systems, etc.

And the use of the various techniques described herein may be combined in a number of ways other than those explicitly mentioned, each of such combinations being obvious to those skilled in the art. For example, the use of comb filters to achieve partial signal decorrelation, as described in U.S. patent application Ser. No. 08/344,320, fully cited above, may also be used in combination with the present invention. In particular, rather than using a monophonic AEC at the high frequencies and the addition of non-linearity in accordance with the present invention at low frequencies (as is done, for example, in the illustrative embodiments shown in FIGS. 4 and 5), comb filters may be used as described in U.S. patent application Ser. No. 08/344,320 at the high frequencies in combination with the addition of non-linearity in accordance with the present invention at low frequencies.

We claim:

1. A method of acoustic echo cancellation for enhancing communication between first and second locations, at which second location multiple source signals are provided and a signal representing at least acoustic echo signals at said second location is generated, the method comprising the steps of:

performing a non-linear transformation on each of one or more channel signals, each channel signal reflecting at least one of the multiple source signals, thereby resulting in two or more reduced correlation source signals;

estimating two or more impulse responses at the second location;

filtering said reduced correlation source signals based on the estimated impulse responses to produce two or more echo estimate component signals; and generating a signal representing a difference between a combination of said echo estimate component signals and said signal representing at least said acoustic echo signals.

2. The method of claim 1 wherein the step of estimating comprises computing parameters representative of the impulse responses.

3. The method of claim 1 wherein one or more additional signals representing at least acoustic echo signals at said second location are generated at said second location, and wherein a separate sequence of said steps of estimating the impulse responses, filtering the reduced correlation source signals, and generating the signal representing said difference, is performed for each of said signals representing acoustic echo signals.

4. The method of claim 1 wherein the multiple source signals provided at the second location were generated at the first location and transmitted from the first location to the second location.

5. The method of claim 1 wherein the step of performing a non-linear transformation on each of said one or more channel signals comprises adding each of the channel signals to a corresponding non-linear function thereof.

6. The method of claim 5 wherein the non-linear function comprises a half-wave rectifier function multiplied by a factor, $\alpha$.

7. The method of claim 6 wherein the factor, $\alpha$, comprises a number less than 0.5.

8. The method of claim 7 wherein the factor, $\alpha$, comprises a number in the range of 0.1 to 0.3.

9. The method of claim 5 wherein the non-linear function comprises a full-wave rectifier function multiplied by a factor, $\alpha$.

10. The method of claim 5 wherein the non-linear function comprises a hard limiter function multiplied by a factor, $\alpha$.

11. The method of claim 5 wherein the non-linear function comprises a square-law function multiplied by a factor, $\alpha$.

12. The method of claim 5 wherein the non-linear function comprises a square-sign function multiplied by a factor, $\alpha$.

13. The method of claim 5 wherein the non-linear function comprises a cubic function multiplied by a factor, $\alpha$.

14. The method of claim 1 wherein the channel signals reflecting the multiple source signals have a limited bandwidth and wherein one or more additional source signals are provided at the second location, the method further comprising the steps of:

estimating at least one additional impulse response at the second location, the additional impulse response comprising a combined impulse response reflecting the two or more impulse responses at the second location;

filtering a signal reflecting at least one of said one or more additional source signals, said filtering based on the at least one additional estimated impulse response and producing at least one additional echo estimate component signal, the signal reflecting said at least one of said one or more additional source signals having a bandwidth which includes one or more frequencies outside of the limited bandwidth of the channel signals reflecting the multiple source signals;

generating a signal representing a difference between a combination of said at least one additional echo estimate component signal and an additional signal representing at least acoustic echo signals at said second location; and combining the signal representing a difference between a combination of said at least one additional echo estimate component signal and an additional signal representing at least acoustic echo signals at said second location, with the signal representing a difference between a combination of said echo estimate component signals and said signal representing at least said acoustic echo signals.

15. The method of claim 14 wherein the channel signals reflecting the multiple source signals comprise bandwidth limited versions of a plurality of original source signals, and wherein the signal reflecting the at least one of said one or more additional source signals is based on a combination of at least two of said original source signals.

16. The method of claim 15 wherein the channel signals reflecting the multiple source signals comprise low-pass filtered versions of the plurality of original source signals.

17. The method of claim 16 wherein the signal reflecting the at least one of said one or more additional source signals comprises a high-pass filtered version of said combination of at least two of said original source signals.

18. The method of claim 14 wherein one of the channel signals reflecting the multiple source signals reflects a sum of at least two of said original source signals, and wherein another one of the channel signals reflecting the multiple source signals reflects a difference of two of said original source signals.

19. An acoustic echo cancelling system for enhancing communication between first and second locations, at which second location multiple source signals are provided and a signal representing at least acoustic echo signals at said second location is generated, the system comprising:

a non-linear transformation module applied to each of one or more channel signals, each channel signal reflecting at least one of the multiple source signals, thereby resulting in two or more reduced correlation source signals;

an impulse response estimator adapted to estimate two or more impulse responses at the second location;

a filter adapted to filter said reduced correlation source signals based on the estimated impulse responses to produce two or more echo estimate component signals; and a signal generator which generates a signal representing a difference between a combination of said echo estimate component signals and said signal representing at least said acoustic echo signals.

20. The system of claim 19 wherein the impulse response estimator computes parameters representative of the impulse responses.

21. The system of claim 19 wherein one or more additional signals representing at least acoustic echo signals at said second location are generated at said second location, and wherein each of said impulse response estimator, said filter, and said signal generator, is separately applied for each of said signals representing acoustic echo signals.

22. The system of claim 19 wherein the multiple source signals provided at the second location were generated at the first location and transmitted from the first location to the second location.

23. The system of claim 19 wherein the non-linear transformation module adds each of the channel signals to a corresponding non-linear function thereof.

24. The system of claim 23 wherein the non-linear function comprises a half-wave rectifier function multiplied by a factor, $\alpha$.

25. The system of claim 24 wherein the factor, $\alpha$, comprises a number less than 0.5.

26. The system of claim 25 wherein the factor, $\alpha$, comprises a number in the range of 0.1 to 0.3.

27. The system of claim 23 wherein the non-linear function comprises a full-wave rectifier function multiplied by a factor, $\alpha$.

28. The system of claim 23 wherein the non-linear function comprises a hard limiter function multiplied by a factor, $\alpha$.

29. The system of claim 23 wherein the non-linear function comprises a square-law function multiplied by a factor, $\alpha$.

30. The system of claim 23 wherein the non-linear function comprises a square-sign function multiplied by a factor, $\alpha$.

31. The system of claim 23 wherein the non-linear function comprises a cubic function multiplied by a factor, $\alpha$.

32. The system of claim 19 wherein the channel signals reflecting the multiple source signals have a limited bandwidth and wherein one or more additional source signals are provided at the second location, the system further comprising:

an impulse response estimator adapted to estimate at least one additional impulse response at the second location, the additional impulse response comprising a combined impulse response reflecting the two or more impulse responses at the second location;

a filter adapted to filter a signal reflecting at least one of said one or more additional source signals, said filter based on the at least one additional estimated impulse response and producing at least one additional echo estimate component signal, the signal reflecting said at least one of said one or more additional source signals having a bandwidth which includes one or more frequencies outside of the limited bandwidth of the channel signals reflecting the multiple source signals;

a signal generator which generates a signal representing a difference between a combination of said at least one additional echo estimate component signal and an additional signal representing at least acoustic echo signals at said second location; and a signal combiner which combines the signal representing a difference between a combination of said at least one additional echo estimate component signal and an additional signal representing at least acoustic echo signals at said second location, with the signal representing a difference between a combination of said echo estimate component signals and said signal representing at least said acoustic echo signals.

33. The system of claim 32 wherein the channel signals reflecting the multiple source signals comprise bandwidth limited versions of a plurality of original source signals, and wherein the signal reflecting the at least one of said one or more additional source signals is based on a combination of at least two of said original source signals.

34. The system of claim 33 wherein the channel signals reflecting the multiple source signals comprise low-pass filtered versions of the plurality of original source signals.

35. The system of claim 34 wherein the signal reflecting the at least one of said one or more additional source signals comprises a high-pass filtered version of said combination of at least two of said original source signals.

36. The system of claim 32 wherein one of the channel signals reflecting the multiple source signals reflects a sum of at least two of said original source signals, and wherein another one of the channel signals reflecting the multiple source signals reflects a difference of two of said original source signals.

37. An acoustic echo cancelling system for enhancing stereophonic communication between first and second locations, at which second location multiple source signals are provided and a signal representing at least acoustic echo signals at said second location is generated, the system comprising:

means for performing a non-linear transformation on each of one or more channel signals, each channel signal reflecting at least one of the multiple source signals, thereby resulting in two or more reduced correlation source signals;

means for estimating two or more impulse responses of the second location;

means for filtering said reduced correlation source signals based on the estimated impulse responses to produce two or more echo estimate component signals; and means for generating a signal representing a difference between a combination of said echo estimate component signals and said signal representing at least said acoustic echo signals.

38. The system of claim 37 further comprising means for combining said reduced correlation source signals in a single channel.

39. The system of claim 37 wherein the non-linear transformation module comprises means for adding each of the channel signals to a corresponding non-linear function thereof.

40. The system of claim 37 wherein the channel signals reflecting the multiple source signals have a limited bandwidth and wherein one or more additional source signals are provided at the second location, the system further comprising:

means for estimating at least one additional impulse response of the second location;

means for filtering a signal reflecting at least one of said one or more additional source signals, said filtering based on the at least one additional estimated impulse response and producing at least one additional echo estimate component signal, the signal reflecting said at least one of said one or more additional source signals having a bandwidth which includes one or more frequencies outside of the limited bandwidth of the channel signals reflecting the multiple source signals;

means for generating a signal representing a difference between a combination of said at least one additional echo estimate component signal and an additional signal representing at least acoustic echo signals at said second location; and means for combining the signal representing a difference between a combination of said at least one additional echo estimate component signal and an additional signal representing at least acoustic echo signals at said second location, with the signal representing a difference between a combination of said echo estimate component signals and said signal representing at least said acoustic echo signals.

* * * * *